United States Patent
Kondoh

(10) Patent No.: US 7,110,136 B1
(45) Date of Patent: Sep. 19, 2006

(54) READING APPARATUS AND DATA PROCESSING SYSTEM

(75) Inventor: Katsuyoshi Kondoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1024 days.

(21) Appl. No.: 09/721,468

(22) Filed: Nov. 22, 2000

(30) Foreign Application Priority Data

Nov. 22, 1999 (JP) ............................ P11-331405

(51) Int. Cl.
G06F 15/00 (2006.01)
(52) U.S. Cl. .................................................. 358/1.18
(58) Field of Classification Search ............... 358/1.18, 358/1.1, 517, 515; 382/175, 284, 176, 257; 399/178, 135, 244; 715/738, 517, 781; 710/100; 400/61, 70, 76
See application file for complete search history.

(56) References Cited

U.S. PATENT DOCUMENTS

| | | | |
|---|---|---|---|
| 4,748,678 A | | 5/1988 | Takeda et al. |
| 4,868,884 A | * | 9/1989 | Miyazaki et al. ............ 382/283 |
| 5,060,280 A | * | 10/1991 | Mita et al. ................... 382/283 |
| 5,140,650 A | | 8/1992 | Casey et al. |
| 5,181,255 A | * | 1/1993 | Bloomberg .................. 382/176 |
| 5,222,159 A | * | 6/1993 | Kawamura et al. .......... 382/283 |
| 5,229,589 A | | 7/1993 | Schneider |
| 5,307,423 A | | 4/1994 | Gupta et al. |
| 5,555,101 A | | 9/1996 | Larson et al. |
| 5,694,494 A | * | 12/1997 | Hart et al. ................... 382/305 |
| 6,018,593 A | | 1/2000 | Yamagata .................... 382/201 |
| 6,336,694 B1 | * | 1/2002 | Ishizaka ......................... 347/2 |
| 6,621,524 B1 | * | 9/2003 | Iijima et al. .................. 348/584 |
| 6,636,647 B1 | * | 10/2003 | Ohki et al. ................... 382/284 |
| 6,819,782 B1 | * | 11/2004 | Imagawa et al. ............ 382/115 |

FOREIGN PATENT DOCUMENTS

| | | |
|---|---|---|
| JP | 1-151667 | 10/1989 |
| JP | 6-290296 | 10/1994 |
| JP | 7-175891 | 7/1995 |
| JP | 10-124685 | 5/1998 |
| JP | 10-222606 | 8/1998 |
| JP | 11-073288 | 3/1999 |
| JP | 11-096297 | 4/1999 |
| JP | A 6-290296 | 11/2000 |

OTHER PUBLICATIONS

European Search Report dated May 7, 2004.

* cited by examiner

Primary Examiner—Mark Wallerson
Assistant Examiner—Saeid Ebrahimi-Dehkordy
(74) Attorney, Agent, or Firm—David C. Conlin; David A. Tucker; Edwards Angell Palmer & Dodge LLP

(57) ABSTRACT

In a reading apparatus, mask data of entry box lines thicker than lines of a layout printed on a form is stored in a storage portion of a reading apparatus, a layout code printed in the vicinity of the entry box of the layout read by a reading portion is read, and with detection marks as a reference, the mask data corresponding to the layout and the image data read by the reading portion are superimposed for deletion, thereby detecting only the entered data. Then, the detected data is transmitted to a printing apparatus, a client terminal or the like. When data printing is performed, the layout data of a layout management apparatus and the detected data are superimposed and printed by the printing apparatus.

12 Claims, 4 Drawing Sheets

READING APPARATUS AND DATA PROCESSING SYSTEM

BACKGROUND OF THE INVENTION

1. Field of the Invention

The present invention relates to a reading apparatus for reading data entered in a form of a predetermined layout, and a data processing system for reading, transmitting and printing the data entered in the form of the predetermined layout.

2. Description of the Related Art

Generally, in the case of data management by the use of forms or the like, data is entered in a predetermined form provided with an entry box. When data entered in a form is transmitted between apparatuses in a data management system organized in a network, a method is frequently used in which the data of the box is deleted in order to reduce the data transmission amount and only the entered data is transmitted in order to reduce the data transmission amount.

Data entry into a form provided with a printed entry box is frequently performed by handwriting and stamping. When data thus entered in a form is transmitted between apparatuses, the entered data is read by a reading apparatus such as a scanner, character recognition is performed, and then the read-out data is transmitted to another apparatus. There have been proposed various methods for deleting entry boxes printed on a form in order to reduce the data transmission amount as described above. For example, Japanese Unexamined Patent Publication JP-A 6-290296 (1994) discloses a technology associated with a character recognition apparatus in which entry box layout data is previously stored in a form layout registration portion and an exclusive OR operation of the entry box layout data and image data read by a reading apparatus is performed to delete entry boxes. By using this apparatus, reduction of data transmission amount and enhancement of character recognition precision can be realized.

However, in the structure of the apparatus disclosed in JP-A 6-290296, since the exclusive OR operation is performed to delete the entry boxes, in the case where there is some blur or spread in the entry boxes of the form, the blurred or spread part cannot be deleted and remains because of the difference from the previously stored layout.

Moreover, when data is entered into a small entry box for data entry by printing with a printing apparatus by handwriting, the data is not always written completely within the entry box. That is, it occurs that some of the written characters contact with the entry box or partly lie off the entry box. When the entry box is deleted from the read out image data including such characters by the method of the publication, the parts of the characters that fall on the entry box are also deleted, so that some parts of the characters are missing. Consequently, the character recognition precision decreases.

As a method of handling data which is partly outside the entry box, for example, Japanese Unexamined Patent Publications JP-A 7-175891 (1995) and JP-A 10-222606 (1998) disclose a method for increasing the character recognition precision of characters which are partly outside the entry box or contact with the entry box by precisely cutting out parts of the characters outside the entry box and correcting the missing parts of the characters due to the deletion of the entry box.

In recent years, since electronic documentation has been advanced because of adoption of office automation (OA), it has been common practice that data input by use of a data input apparatus such as a personal computer is managed in a unified way by a storage apparatus and data entry (printing) into a form is performed by use of a printing apparatus such as a printer. Therefore, placing more importance on the browsability of the data than on the convenience of data entry, entry boxes of the form are frequently small. However, even in recent years, not all the data has been entered by a printing apparatus and there have been cases where data is entered by handwriting. Therefore, in this case, a form in which data has been entered is read by a reading apparatus and character recognition is performed to perform data input; however, in layouts premised on the use of a printing apparatus such as a printer as described above, the entry box is frequently too small for data to be entered therein by handwriting. For this reason, it is apt to occur that written characters are partly outside the entry box or are in contact with the entry box.

This problem can be solved by using the technologies disclosed in JP-A 7-175891 and JP-A 10-222606. However, the program of the apparatus becomes complicated, which increases the cost of the apparatus.

SUMMARY

An object of the invention is to provide a reading apparatus capable of surely deleting entry boxes, extracting only entered data and transmitting the data even if entry boxes printed on the form and the entered data are patchy or smeared.

Another object of the invention is to provide a data processing system preventing entered data from overlapping lines of data entry boxes of a form.

In order to solve the above-mentioned problems, the invention provides a reading apparatus comprising:

a reading portion for reading data entered in a form where a predetermined layout is printed;

a storage portion in which mask data to be superimposed on read out image data is stored; and a control portion for controlling an entirety of the apparatus, wherein the control portion superimposes the mask data on the image data, and deletes a part of image data covered with the mask data to thereby extract the data entered in the form from the image data.

According to this structure, the control portion of the reading apparatus reads mask data stored in the storage portion, superimposes the mask data on the image data read by the reading portion, and deletes a part of the image data covered with the mask data to thereby extract the data entered in the form. Consequently, even if an entry box or the like printed on the form becomes patchy or smeared when the form is printed or read out, the layout can be completely deleted to extract the data entered in the form. Moreover, by deleting the layout from the read out image data, for example, the amount of the data to be transmitted in transmission of the entered data can be reduced.

In the invention it is preferable that the control portion reads a layout code previously printed on the form by the reading portion, and reads mask data of the layout corresponding to the layout code from the storage portion.

According to this structure, the mask data corresponding to the layout code previously printed on the form read by the reading portion is read from the storage portion. Consequently, even when a plurality of kinds of form layouts are prepared, the entered data can be surely extracted in accordance with the read out layout.

In the invention it is preferable that the control portion reads a detection mark previously printed on the form by the reading portion, and corrects position and inclination of the image data.

According to the invention, the control portion corrects the position and inclination of the image data based on the detection mark previously printed on the form read by the reading portion. Consequently, the layout can be precisely deleted even if there are displacement, inclination and the like in the read out image data.

In the invention it is preferable that the control portion reads the detection mark previously printed on the form by the reading portion to match the size of the image data to the size of the mask data read from the storage portion.

According to the invention, the size of the image data and the size of the mask data are matched to each other based on the detection mark previously printed on the form read by the reading portion. Consequently, even when the layout is printed so as to be enlarged on the form to facilitate entry of small characters such as the pronunciation in kana characters by handwriting, the layout can be precisely deleted to extract only the entered data.

In the invention it is preferable that the control portion reads a print magnification previously printed on the form by the reading portion, and reads from the storage portion the mask data of a size corresponding to the print magnification.

According to this structure, the mask data to be superimposed on the image data is read from the storage portion based on the print magnification previously printed on the form read by the reading portion. Consequently, the mask data can be easily selected even when the layout is enlarged, so that the superimposition of the image data and the mask data can be quickly performed.

In the invention it is preferable that in the storage portion, mask data of thicker entry box lines than the entry box lines of the layout printed on the form is stored.

According to this structure, the entry box lines of the mask data superimposed on the image data are thicker than the entry box lines of the layout printed on the form. Consequently, the mask data can cover the image data even if there are displacements, inclination, blur and the like in the read out image data, so that the layout can be surely deleted.

In the invention it is preferable that the mask data is data of print areas of the predetermined layout, layout code and detection marks.

According to this structure, the mask data stored in the storage portion is data of the print areas of the predetermined layout, layout code and detection marks. Consequently, only the entered data can be extracted by deleting not only the layout printed on the form but also the data of the layout code for selecting the mask data of the predetermined layout and the detection marks used for superimposing the read out image data and the mask data.

The invention provides a data processing system comprising:

reading means for reading data entered in a form where a predetermined layout is printed, superimposing mask data covering part of the predetermined layout on the read image data and deleting the layout from the image data by deleting the data of the part covered with the mask data, thereby extracting the entered data;

layout management means for managing layout data of the layout used for the form; and printing means for superimposing the entered data transmitted from the reading means and the layout data transmitted from the layout management means, and printing out the data.

According to this structure, the data processing system comprises the reading means, the layout management means and the printing means. The reading means reads data entered in a predetermined layout printed form, superimposes mask data covering part of the predetermined layout on the read out image data, and deletes the layout from the image data by deleting the data of the part covered with the mask data, thereby extracting the entered data. The layout management means manages the data of the layout used for the form. The printing means superimposes the entered data transmitted from the reading means and the layout data transmitted from the layout management means, and prints out the data. Consequently, even when the amount of the image data read by the reading means is large, the amount of the data transmitted from the reading means to the printing means can be reduced, so that the loads on the means of the data processing system can be reduced.

In the invention it is preferable that the layout management means registers a layout where parts for data entry are enlarged and an original layout where the parts are not enlarged so as to be associated with each other.

According to this structure, the layout management means of the data processing system registers the layout where the parts for data entry are enlarged and the original layout where the parts are not enlarged so as to be associated with each other. Consequently, the data entered in the enlarged layout is recognized as the data entered in the original layout being not enlarged, so that the data entered in the enlarged layout can be handled as the data entered in the original layout being not enlarged.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
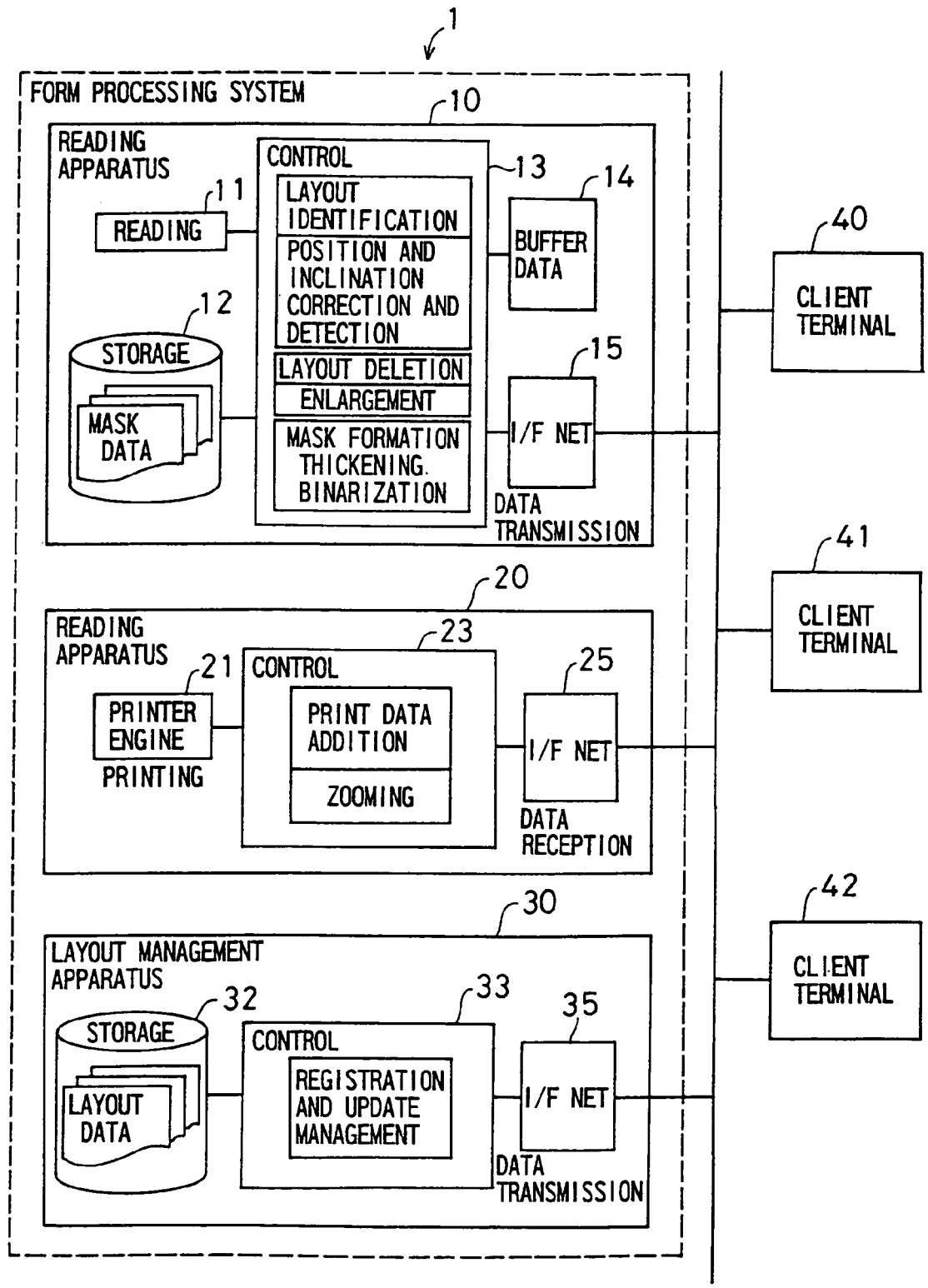
FIG. 1 is a view showing the structure of a form processing system.

Now referring to the drawings, preferred embodiments of the invention are described below.

In one embodiment of the invention, description will be given by showing as an example a case where a data processing system is applied to a form processing system.

FIG. 1 is a view showing the structure of the form processing system. In the form processing system 1, a network is constituted by apparatuses such as a reading apparatus 10 as the reading means, a printing apparatus 20 as the printing means and a layout management apparatus 30 as the layout management means, and these apparatuses are connected by communication lines to perform data transmission and reception. Moreover, a client terminal 40, a client terminal 41 and a client terminal 42 are connected to the network.

The reading apparatus 10 reads data entered in a predetermined-layout-printed form, superimposes mask data covering part of the data such as the entry box lines of the predetermined layout on the read out image data, and deletes data of a part covered with the mask data, thereby deleting the layout from the image data to extract the entered data. The printing apparatus 20 superimposes the entered data transmitted from the reading apparatus 10 and the layout data transmitted from the layout management apparatus 30, and prints out the data. The layout management apparatus 30 manages the data of the layout used for the form. The client terminals 40, 41 and 42 are apparatuses for the user of the form processing system 1 to input data and provide various instructions. For example, personal computers are used as the terminals 40 to 42.

The reading apparatus 10 includes a reading portion 11 for reading the data entered in a form such as an invoice, a storage portion 12 for storing the mask data for deleting the data corresponding to the entry box printed on the form from the image data read by the reading portion 11, a control portion 13 for performing the layout deletion based on the image data and mask data and controlling the portions of the reading apparatus, a data buffer 14 in which the image data read by the reading portion 11 is temporarily stored, and a data transmitting portion (net I/F) 15 for transmitting the data having undergone the layout deletion to another networked apparatus (e.g. the printing apparatus 20).

The printing apparatus 20 includes a printing portion (printer engine) 21 for performing printing, a control portion 23 for controlling printing, and a data receiving portion (net I/F) 25 for receiving print data.

The layout management apparatus 30 includes a storage portion 32 in which the data of the layout printed on the form is stored, a control portion 33 for managing registration and update of the layout data, and a data transmitting portion (net I/F) 35 for transmitting the layout data to another networked apparatus (e.g. the reading apparatus 10 or printing apparatus 20).

Figure 2:
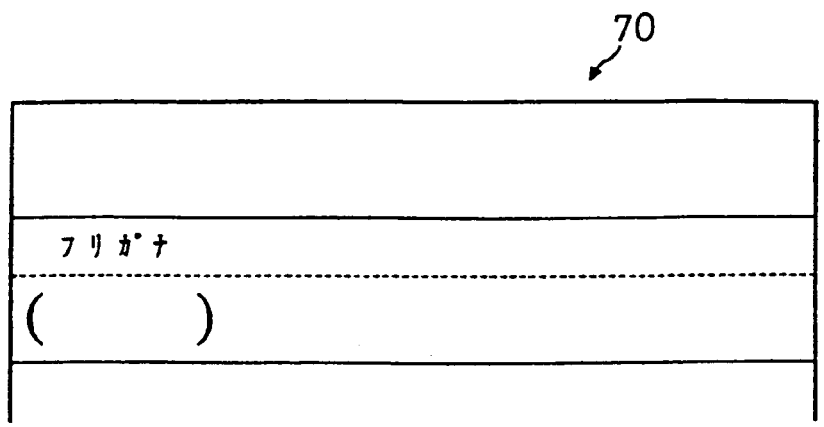
FIG. 2 is a view showing a layout for data entry by handwriting.
Figure 3:
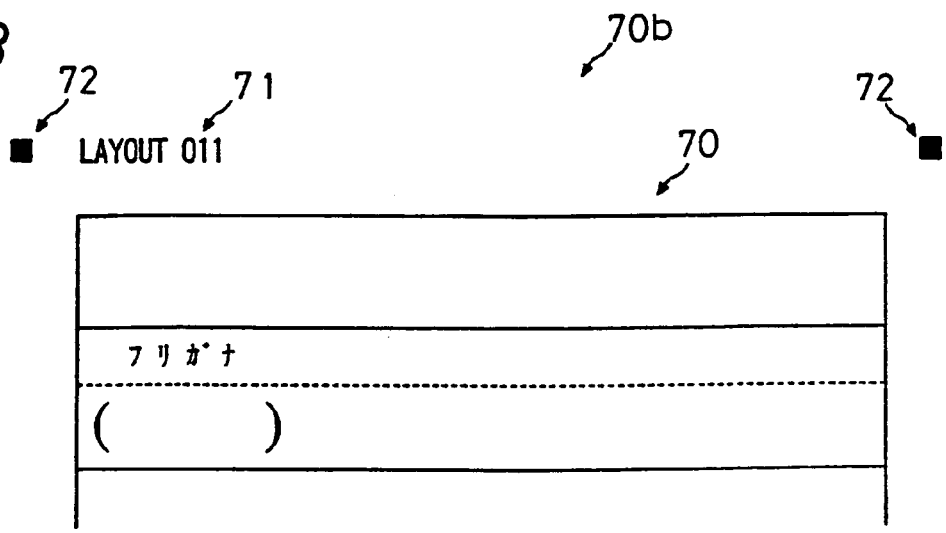
FIG. 3 is a view showing a layout where a layout code and detection marks are added to the layout of FIG. 2.
Figure 4:
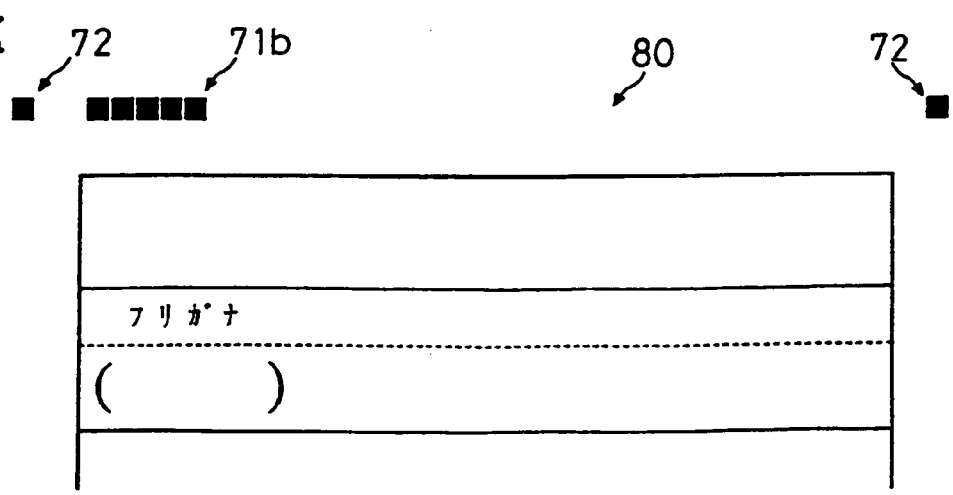
FIG. 4 is a view showing the mask data for the layout shown in FIG. 3.
Figure 5:
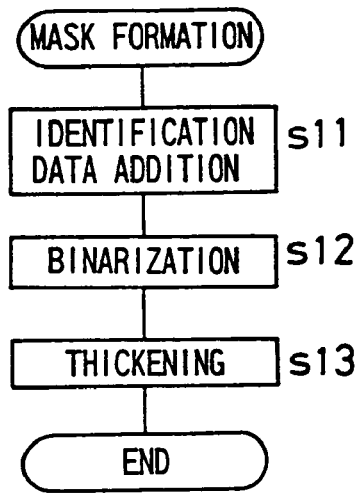
FIG. 5 is a flowchart showing a procedure of mask data formation.
Figure 6:
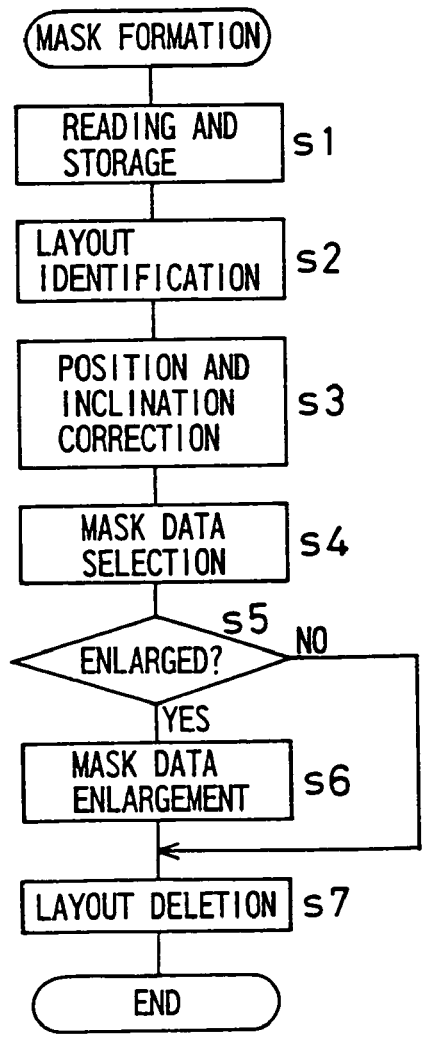
FIG. 6 is a flowchart showing a procedure of data processing in the reading apparatus.
Figure 7:
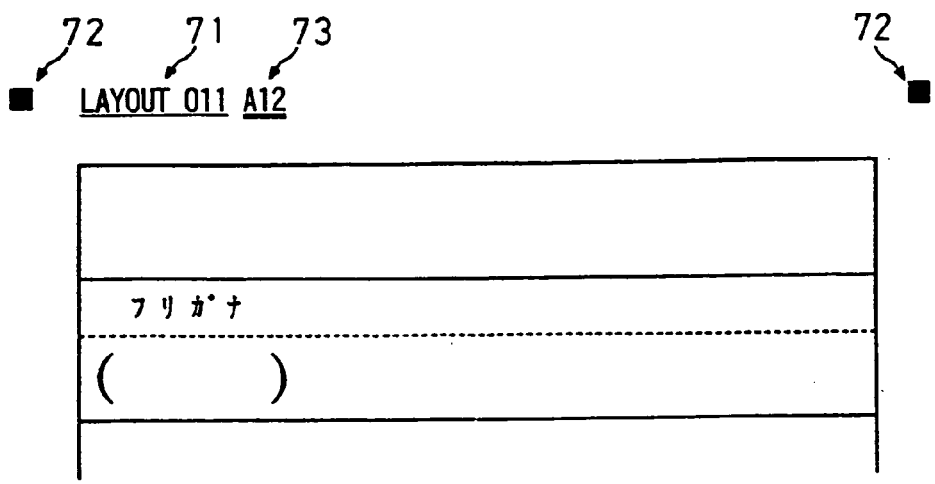
FIG. 7 is a view showing a layout with an enlarged entry box.
Figure 8:
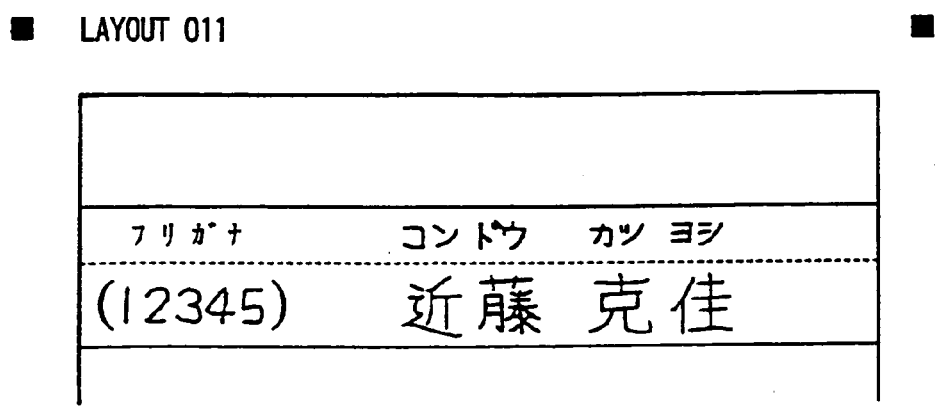
FIG. 8 is a view showing an example of data entered in the layout.
Figure 9:
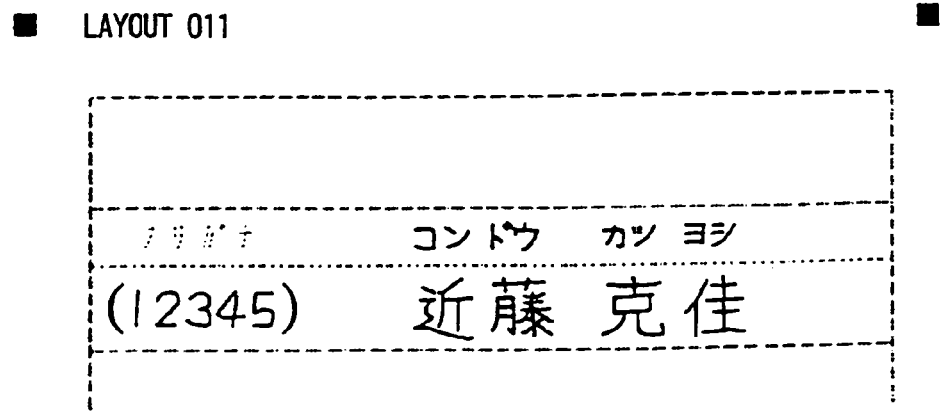
FIG. 9 is a view showing an example where the entry box of the layout is deleted.

Next, an example of the form used for the form processing system 1 and a method of processing the form will be described with reference to FIGS. 2 to 9. FIG. 2 is a view showing a layout for data entry by handwriting. FIG. 3 is a view showing a layout where a layout code and detection marks are added to the layout of FIG. 2. FIG. 4 is a view showing the mask data for the layout shown in FIG. 3. FIG. 5 is a flowchart showing a procedure of mask data formation. FIG. 6 is a flowchart showing a procedure of data processing in the reading apparatus. FIG. 7 is a view showing a layout with an enlarged entry box. FIG. 8 is a view showing an example of data entered in the layout 70. FIG. 9 is a view showing an example where the entry box of the layout is deleted.

According to the invention, previously formed mask data of the lines of the entry box or the like is superimposed on the image data of the form read by the reading apparatus 10, and the data of the part covered with the mask data is deleted from the image data. The entered data which is the data of the part not covered with the mask data is transmitted to another networked apparatus, for example, a printing apparatus for printing. By doing this, the data transmission amount can be reduced to lighten the loads on the apparatuses of the form processing system 1. In the printing apparatus 20, the data of the entry box transmitted from the layout management apparatus 30 and the entered data transmitted from the reading apparatus 10 are superimposed and printed onto a predetermined sheet.

When the form processing system 1 is used, a layout 70b as shown in FIG. 3 where a layout code 71 and detection marks 72 are added to the layout 70 of FIG. 2 registered in the layout management apparatus 30 is previously printed on the form by the printing apparatus 20. The layout code 71 is for identifying the layout 70. The detection marks 72 are used as a reference for alignment when the image data read by the reading portion 11 of the reading apparatus 10 and the mask data 80 read from the storage portion 12 are superimposed. Moreover, the mask data 80 as shown in FIG. 4 that is superimposed on the image data to delete the layout is previously formed and stored in the storage portion 12 of the reading apparatus 10.

A procedure of mask data formation will be described with reference to the flowchart of FIG. 5. First, the user of the form processing system 1 (hereinafter, referred to as user) provides an instruction to form the mask data by use of any of the client terminals 40 to 42. In response to the instruction, the control portion 33 of the layout management apparatus 30 transmits the layout data stored in the storage portion 32 to the reading apparatus 10. The control portion 13 of the reading apparatus 10 forms the layout data 70b to which the layout code 71 and the detection marks 72 are added in a predetermined position of the received layout data 70 (s11).

Then, the control portion 13 of the reading apparatus 10 binarizes the data. That is, each pixel is converted into 1-bit data of 1 or 0 in order that the layout 70 printed on the form can be deleted even if the layout 70 has gradations or is colored (s12).

Then, the control portion 13 of the reading apparatus 10 performs thickening on the binarized data (s13). Here, the thickening is a processing to increase the thickness of the lines and characters of the entry box and the layout code 71 of the layout 70b printed on the form so that an area larger than the print area of the entry box lines and the layout code 71 of the layout 70b is the mask data 80. By performing this processing, even when the data is read by the reading apparatus 10 with a slight blur or inclination being caused in the printing or reading of the form, by superimposing the mask data 80 having undergone the thickening on the image data, the part of the layout can be surely deleted even if there is a slight displacement from the original layout.

Since the mask data 80 is formed to delete the entry box lines, unnecessary characters and the like of the image data, for the displayed characters of the layout code 71, the mask data 80 may be squares filled in to cover the characters. The detection marks 72 are the reference for the superimposition of the image data and the mask data 80. For this reason, the thickening is not performed on the detection marks 72.

As described above, the mask data 80 for deleting the layout is previously formed and stored in the storage portion 12 of the reading apparatus 10 and data is entered by handwriting in the form where the layout 70b is printed. Then, the form in which data has been entered is read by the reading apparatus 10, and the layout 70b is deleted from the obtained image data to thereby extract only substantial entered data.

A processing to perform such layout deletion will be detailed with reference to the flowchart of FIG. 6. The user provides an instruction to delete the layout to the reading apparatus 10 by use of any of the client terminals 40 to 42 of the form processing system 1. In response to the instruction, the control portion 13 of the reading apparatus 10 reads by the reading portion 11 the form in which data has been entered. Then, the control portion 13 temporarily stores the obtained image data in the data buffer 14 (s1). Then, the control portion 13 performs identification of the layout code 71 on the image data stored in the data buffer 14 (s2). This is a processing for identifying the layout printed on the form when a plurality of layouts are managed by the layout management apparatus 30 and the mask data for the layouts are stored in the storage portion 12. For example, when the layout 70b shown in FIG. 3 is printed on the form, the layout code 71 is printed as mentioned above. The control portion 13 of the reading apparatus 10 identifies the layout of the form by reading the layout code 71 by the reading portion 11. The identification of the layout code 71 which is necessary when a plurality of layouts are managed can be omitted when the layout management apparatus 30 manages only one kind of layout.

In succession to the identification of the layout code 71, the control portion 13 performs a position and inclination correction on the image data (s3). The position and inclination correction is a processing for eliminating displacements due to inclination between the image data and the mask data when the mask data is superimposed on the read out image data to delete the layout. Therefore, the position and inclination correction is performed on the read out image data based on the detection marks 72 previously printed on the form as shown in FIG. 3 to detect the position of the layout 70.

Then, the control portion 13 selects mask data based on the layout code 71 of the image data read by the reading portion 11 (s4). That is, when a plurality of layouts are managed by the layout management apparatus 30, since a plurality of mask data corresponding to these layouts are stored in the storage portion 12 of the reading apparatus 10, the appropriate mask data 80 corresponding to the layout 70 printed on the form is selected from among the layouts.

After the mask data 80 is selected based on the layout data, the control portion 13 determines whether the layout 70 on the form is enlarged or not (s5). As mentioned above, when a layout with an entry box that is not large enough for data entry by handwriting is used, there is a possibility that the entered data is partly outside the entry box. Therefore, by printing on the form a layout where the entry box is enlarged to a predetermined size by changing the print magnification of the entry box so that the data entry by handwriting is facilitated, data entry can be performed without the entered data being in contact with the entry box or partly outside the entry box. In this case, as shown in FIG. 7, in addition to the layout code 71, a magnification code 73 representative of the magnification with respect to the original layout is printed on the form where the layout is enlarged. By reading the magnification code 73, the magnification of the layout on the form can be easily recognized.

When the magnification code 73 is not printed on the form, the control portion 13 detects the detection marks 72, and measures the distance between the detection marks 72 to obtain the print magnification of the layout 70.

Here, the enlarged part of the layout on the form may be the entire area or only the part into which data is to be entered by handwriting. In a case where the layout is printed on the form so as to be enlarged, printing the entire area of the layout requires a large-size form which is inconvenient to handle. However, by printing the layout so that only the part into which data is to be entered by handwriting is enlarged, it is unnecessary to use a large-size form. Consequently, a form of an appropriate size can be used, so that the handling of the form in printing, data entry and reading is facilitated.

When enlargement of the layout on the form is recognized, the control portion 13 recognizes the magnification based on the code representative of the magnification printed on the form, and enlarges the mask data selected at step s4 at the same magnification as the layout on the form (s6). When the magnification is limited because of the size of the form, the following may be performed: Mask data enlarged at a predetermined magnification is previously stored in the storage portion and after the magnification of the layout on the form is determined, mask data is selected based on the layout and the magnification. In this case, steps s5 and s6 are omitted in FIG. 6.

After appropriate mask data is selected at steps s4 to s6 as described above, the control portion 13 superimposes, with the detection marks 72 as the reference, image data as shown in FIG. 8 obtained by reading by the reading apparatus the form in which data has been entered by handwriting, and the mask data 80 shown in FIG. 4 selected from among the data stored in the storage portion 12, and deletes the data of the part covered with the mask data from the image data (s7).

As mentioned above, in the mask data 80, the lines of the entry box are slightly thicker than those of the layout 70 on the form. For this reason, even when slight displacements, inclination, distortion and the like are caused in the image data in reading the form, the layout 70 in the image data read from the form can be surely deleted. Consequently, as shown in FIG. 9, the entry box of the layout, the layout code 71 and the printed parts of the detection marks 72 (the projective parts of FIG. 9) are deleted, so that only the data entered by handwriting is left.

At step s5, when the layout on the form is not enlarged, step s7 is executed next.

As described above, of the read out handwritten data, only the handwritten data is transmitted to another networked apparatus when necessary without undergoing any processing or after undergoing character recognition when necessary, and stored and saved in an external storage apparatus, used for various processings in the host computer, or printed out by the printing apparatus. As described above, by transmitting only the entered data, the loads on the apparatuses of the form processing system 1 can be lightened.

When the entered data is printed out by the printing apparatus 20, the entered data is transmitted from the reading apparatus 10 via the data transmitting portion 15. Moreover, the layout data corresponding to the layout of the form read by the reading apparatus 10 is transmitted from the layout management apparatus 30 via the data transmitting portion 35. Then, the entered data and the layout data received via the data transmitting portion 25 of the printing apparatus 20 are superimposed by the control portion 23 of the printing apparatus 20. Then, the data is printed onto a predetermined record sheet by the printing portion 21.

In the layout management apparatus 30, the layout where the part into which data is to be entered is enlarged and the original layout where the part is not enlarged are registered so as to be associated with each other. This association is made by use of the layout code 71 and the magnification code 73. Therefore, by reading the layout code 71 and the magnification code 73 with which the print magnification is displayed, the original layout of the form can be immediately recognized and called.

Moreover, for the data of the partly or wholly enlarged form read by the reading apparatus 10, the print size of the data is adjusted by the control portion 23 of the printing apparatus 20 so that the data is printed within the entry box of the layout data transmitted from the layout management apparatus 30.

Further, the user can process the read out entered data by use of any of the client terminals 40 to 42.

While the data processing system has been described with a form processing system as an example, the invention is not limited thereto but may be applied to other systems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reading apparatus comprising:
   a reading portion for reading an image of data entered in a form where a predetermined layout is printed;
   a storage portion in which mask data of the predetermined layout to be superimposed on a read out image is pre-stored; and
   a control portion for controlling an entirety of the apparatus,
   wherein the control portion superimposes the mask data on the image, and deletes a part of image covered with the mask data to thereby extract the data entered in the form from the image, and
   wherein the control portion reads a layout code previously printed on the form by the reading portion, and reads mask data of the layout corresponding to the layout code from the storage portion.

2. The reading apparatus of claim 1, wherein the control portion reads
   a detection mark previously printed on the form by the reading portion, and corrects position and inclination of the image.

3. The reading apparatus of claim 1 wherein the control portion reads the detection mark previously printed on the form by the reading portion and adjusts the size of the image and the size of the mask data read from the storage portion to each other.

4. The reading apparatus of claim 2, wherein the control portion reads the detection mark previously printed on the form by the reading portion and adjusts the size of the image and the size of the mask data read from the storage portion to each other.

5. The reading apparatus of claim 1, wherein the control portion reads a print magnification previously printed on the form by the reading portion, and reads from the storage portion the mask data of a size corresponding to the print magnification.

6. The reading apparatus of claim 2, wherein the control portion reads a print magnification previously printed on the form by the reading portion, and reads from the storage portion the mask data of a size corresponding to the print magnification.

7. The reading apparatus of claim 1, wherein in the storage portion, mask data of thicker entry box lines than the entry box lines of the layout printed on the form is stored.

8. The reading apparatus of claim 2, wherein in the storage portion, mask data of thicker entry box lines than the entry box lines of the layout printed on the form is stored.

9. The reading apparatus of claim 2, wherein the mask data is data of print areas of the predetermined layout, layout code and detection marks.

10. The reading apparatus of claim 8, wherein the mask data is data of print areas of the predetermined layout, layout code and detection marks.

11. A data processing system comprising:
    the reading apparatus according to claim 1;
    layout management means for managing layout data of the layout used for the form; and
    printing means for superimposing the entered data transmitted from the reading apparatus and the layout data transmitted from the layout management means, and printing out the resultant image.

12. The data processing system of claim 11, wherein the layout management means registers a layout where parts for data entry are enlarged and an original layout where the parts are not enlarged so as to be associated with each other.

* * * * *